(12) United States Patent
Toyoda

(10) Patent No.: US 6,371,623 B1
(45) Date of Patent: Apr. 16, 2002

(54) SPREAD ILLUMINATING APPARATUS WITH A MEANS FOR CONTROLLING LIGHT DIRECTIVITY

(75) Inventor: Koichi Toyoda, Iwata-gun (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/625,195

(22) Filed: Jul. 21, 2000

(30) Foreign Application Priority Data

Aug. 16, 1999 (JP) .............................................. 11-229742

(51) Int. Cl.[7] .................................................. F21V 8/00
(52) U.S. Cl. ........................ 362/31; 362/331; 362/339; 362/800
(58) Field of Search ............................ 362/31, 26, 339, 362/268, 331, 800; 349/61, 65

(56) References Cited

U.S. PATENT DOCUMENTS

| | | | | |
|---|---|---|---|---|
| 4,714,983 A | * | 12/1987 | Lang | 362/27 |
| 5,381,309 A | * | 1/1995 | Borchardt | 362/31 |
| 5,806,955 A | * | 9/1998 | Parkyn, Jr. et al. | 362/31 |
| 5,961,197 A | * | 10/1999 | Watai et al. | 362/31 |
| 6,086,212 A | * | 7/2000 | Onishi et al. | 362/31 |
| 6,334,691 B1 | * | 1/2002 | Suzuki et al. | 362/31 |

\* cited by examiner

Primary Examiner—Thomas M. Sember
(74) Attorney, Agent, or Firm—Oliff & Berridge, PLC

(57) ABSTRACT

The light L emitted from the light emitting diode 4 refracts while passing through the prism sheet 5 and its directivity is modified, whereby the illuminating area is extended further. As a result, the emitting distribution pattern A of the light covers approximately all over the transparent substrate 2. The light thus having entered the transparent substrate 2 is refracted by the groove 2a, and the liquid crystal element contacting with the lower surface of the transparent substrate 2 is illuminated uniformly.

21 Claims, 5 Drawing Sheets

SPREAD ILLUMINATING APPARATUS WITH A MEANS FOR CONTROLLING LIGHT DIRECTIVITY

BACKGROUND OF THE INVENTION

1. Field of the Invention

The present invention relates to a spread illuminating apparatus used as an illuminating means for signboards, various kinds of reflection-type displays and so on.

2. Conventional Art

Electric products nowadays have a function to display various information, and need to be equipped with a display portion to display the information. And, for portable electric products such as a mobile phone or a note-type personal computer wherein all components are expected to be miniaturized and light weight, a liquid crystal display (the ratio of thickness to display area is extremely small) has been widely used as the display portion because of its small occupation volume in the products and light weight. On the other hand, since the liquid crystal display does not emit light by itself, an illuminating apparatus besides the liquid crystal display apparatus needs to be provided when using in a dark area or at night. For realizing an illuminating apparatus capable of emitting light uniformly over the whole display portion, a below-explained illuminating apparatus has been invented.

A spread illuminating apparatus has a transparent substrate made of a transparent material and disposed on the front or rear surface of a liquid crystal display apparatus, and illuminates the entire liquid crystal display apparatus while illuminating the side surface of the transparent substrate to introduce light into the transparent substrate and then to uniformly supply the introduced light through the surface of the transparent substrate to the display portion of the liquid crystal display apparatus.

Now, a fluorescent tube (cold cathode ray fluorescent tube or hot cathode ray fluorescent tube) has been conventionally used as a light source to illuminate the side surface of the transparent substrate. However, a high voltage is needed for the fluorescent tube to emit light, accordingly a high voltage supplying means is required, resulting in conflict with the demand that portable product components be miniaturized and light weight. For solving the above-described problem, the present inventors have developed a spread illuminating apparatus applying a spot-like light source such as a light emitting diode, etc., and the present applicant has disclosed details in the Japanese Patent Application No. Hei 1-182076. The spread illuminating apparatus having a light emitting diode as a light source is briefly explained with reference to FIG. 7. The spread illuminating apparatus comprises a transparent substrate 2 overlapping on an upper surface of a liquid crystal element 1, and a bar-like light conductive member 3 disposed at the end of the transparent substrate 2, with a light emitting diode (LED) 4 disposed at the end of the light conductive member 3.

A number of grooves 2a (a light emitting element) shown in FIG. 8 are provided in parallel on the front surface (the upper surface in Fig.) of the transparent substrate 2. Further, a number of prism shaped portions 3a are provided in a longitudinal direction of the light conductive member 3. According to this structure, light emitted from the LED 4 first enters the light conductive member 3 and is refracted at the prism shaped portions 3a. And, the light progresses from the whole of the light conductive member 3 uniformly toward the transparent substrate 2. Further, the light having progressed into the transparent substrate 2 is refracted at the grooves 2a and emitted from the whole of the rear surface (the lower surface in Fig.) of the transparent substrate 2. As a consequence, a uniform brightness can be achieved over the entire liquid crystal element 1. An observer views the display of the liquid crystal element 1 through the transparent substrate 2, but the display of the liquid crystal element 1 is not visibly disturbed since the groove 2a is quite minute.

Now, the above-described spread illuminating apparatus has satisfied the demand for the uniform illumination on the liquid crystal display apparatus, but, such spread illuminating apparatus as shown in FIGS. 9 and 10 have been invented for a further increase in brightness. In the spread illuminating apparatus shown in FIGS. 9 and 10, the LED 4 illuminates the transparent substrate 2 directly, which eliminates any lose incurred in the light conductive member 3 (FIG. 7) and improves the brightness. Moreover, FIGS. 9 and 10 indicate only one LED 4 per transparent substrate 2, but it is possible to juxtapose a plural number of LED& 4 at the end of the transparent substrate 2.

However, a problem newly occurs when applying this constitution. That is, light emitted from the LED 4 as a spot-like light source has directivity to some extent. Accordingly, as shown in FIGS. 9 and 10, the light which enters directly the transparent substrate 2 is adapted to emphasize an emitting distribution pattern (the range to be illuminated) A characterized by the LED 4 and illuminates especially brighter the portion right beneath the emitting distribution pattern A than other portions of the liquid crystal element 1, developing unevenness in brightness. Even if a plural number of LEDs 4 are juxtaposed at the end of the transparent substrate 2, such a problem has never been completely solved with the generation of dark and bright area in the brightness still remaining on the liquid crystal element 1.

The present invention has been made in the light of the above problem, and the object thereof resides in that a miniaturized and light weighted spread illuminating apparatus has a uniform illumination while realizing a high brightness.

In order to solve the above problem, according to a first aspect of the present invention, in a spread illuminating apparatus, in which a spot-like light source is disposed near the side of a transparent substrate made of a transparent material facing the transparent substrate, a control means for controlling the directivity of light entering the transparent substrate is provided between the transparent substrate and the spot-like light source.

According to the present invention, since the directivity of the light emitted from the spot-like light source is controlled by the control means before entering the transparent substrate, the emitting distribution pattern characterized by the spot-like light source can be modified by the time the light enters the transparent substrate.

According to a second aspect of the present invention, in the above spread illuminating apparatus, a light diffusion film as the above control means is disposed between the side surface of the transparent substrate and the spot-like light source. Further, according to a third aspect of the present invention, in the above spread illuminating apparatus, a prism sheet as the control means is disposed between the side surface of the transparent substrate and the spot-like light source. Moreover, according to a fourth aspect of the present invention, in the above spread illuminating apparatus, a concave lens-like sheet as the control means is disposed between the side surface of the transparent substrate and the spot-like light source. By applying these control means, the directivity of the light emitted from the spot-like light source is controlled, and the emitting distribution pattern characterized by the spot-like light source can be modified by the time the light enters the transparent substrate.

Further, according to a fifth aspect of the present invention, in the above spread illuminating apparatus, the control means is formed on the side surface of the transparent substrate. Since the control means can fulfill a given function when disposed between the transparent substrate and the spot-like light source, number of parts may be reduced while securing such function by forming the control means on the side surface of the transparent substrate as the present invention.

According to a six aspect of the present invention, in the above spread illuminating apparatus, the light diffusion characteristic of the control means is optimized in a manner that the diffusion characteristic is varied at each position based on the emitting distribution characteristic of the spot-like light source. By this constitution the emitting distribution pattern characterized by the spot-like light source can be modified more effectively.

Further, according to a seventh aspect of the present invention, in the above spread illuminating apparatus, the control means is formed with a given distance between the light emitting element provided on the transparent substrate and the spot-like light source. In the present invention, considering a feature that the emitting distribution pattern characterized by the spot-like light source spreads wider with an increase in the distance from the spot-like light source modifying the light directivity, the light emitting element of the transparent substrate is provided at a distance where the emitting distribution pattern is not recognised, whereby the uniform illumination by the spread illuminating apparatus can be realized.

Further, according to a eighth aspect of the present invention, in the above spread illuminating apparatus, the given distance is determined in consideration of how the directivity of the light emitted from the spot-like light source is modified. As mentioned above, the emitting distribution pattern characterized by the spot-like light source spreads wider with an increase in the distance from the spot-like light source modifying the light directivity. Therefore, in the present invention, the unevenness in the illumination due to a clear appearance of the emitting distribution pattern is prevented by measuring the distance from the spot-like light source.

Further, according to a ninth aspect of the present invention, in the above spread illuminating apparatus, the spot-like light source is disposed in a manner that the axis of the light emitted from the spot-like light source makes a given angle against a spreading surface of the transparent substrate, and a reflection means is provided to turn the axis of the emitted light in a direction parallel with the spreading surface of the transparent substrate. By this constitution, a distance between the spot-like light source and the transparent substrate is secured in a three dimensional positional relation.

Still further, according to a tenth aspect of the present invention, in the above spread illuminating apparatus, the control means is constituted by combining two or more control means for controlling the directivity of light described in the second to the ninth aspects. According to the present invention, the light directivity is controlled multiply before the light emitted from the spot-like light source enters the transparent substrate, whereby the emitting distribution pattern characterized by the spot-like light source is more effectively modified.

EMBODIMENT

Hereinafter, embodiments of the present invention will be explained based on the attached drawings. For reference, as to portions identical with or relevant to the conventional art, identical signs are attached, and detailed explanations thereof are omitted.

Figure 1:
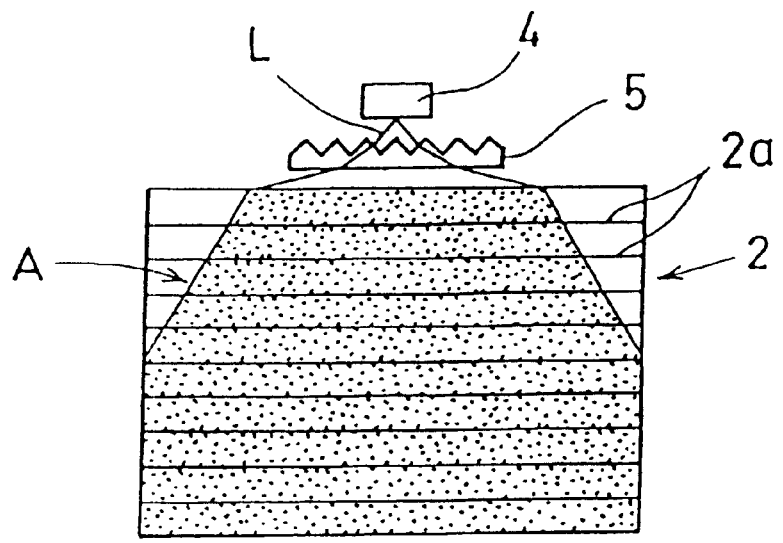
FIG. 1 is a schematic diagram of the main portion of the first embodiment of the spread illuminating apparatus of the present invention.

FIG. 1 shows a schematic diagram of the main portion of the spread illuminating apparatus of the first embodiment of the present invention. In this spread illuminating apparatus a light emitting diode 4 is disposed near the side surface of the transparent substrate 2 facing the transparent substrate 2. Further, a prism sheet 5 is disposed between the transparent substrate 2 and the light emitting diode 4. And, for explanation's sake, the dimensional proportion between the transparent substrate 2, the light emitting diode 4 and the prism sheet 5 is not actual (this applies to the embodiments to follow hereinafter).

Figure 7:
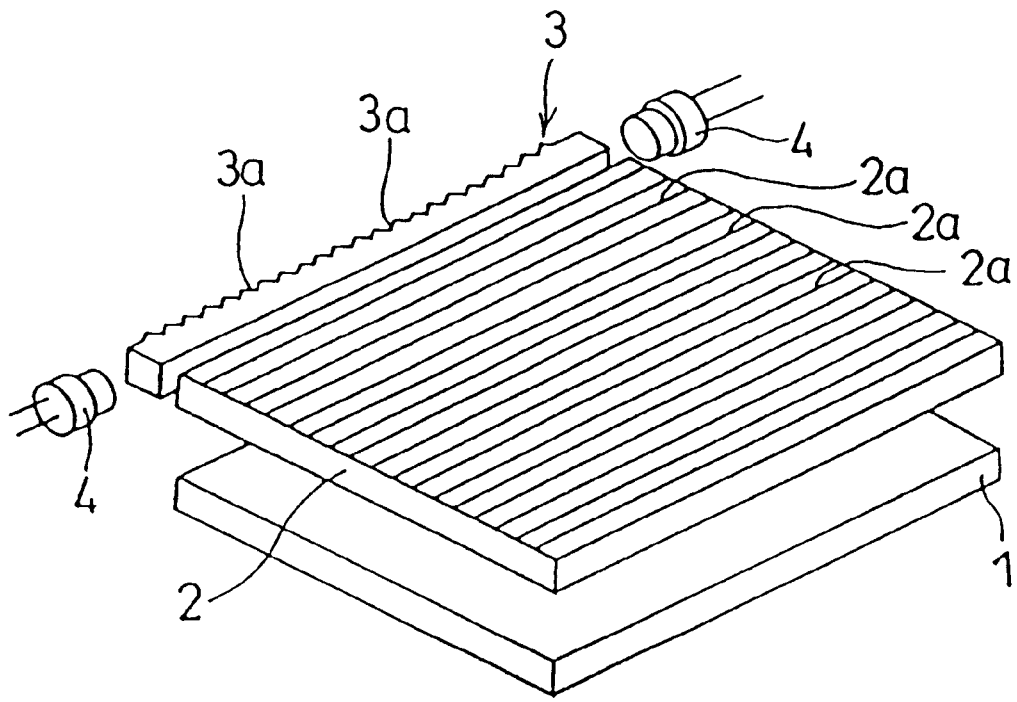
FIG. 7 is a perspective view of the spread illuminating apparatus using a light emitting diode as the spot-like light source.
Figure 8:
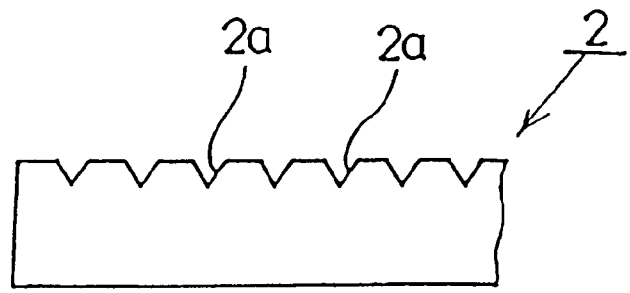
FIG. 8 is an enlarged side view of the shape of the groove on the transparent substrate shown in FIG. 7.
Figure 9:
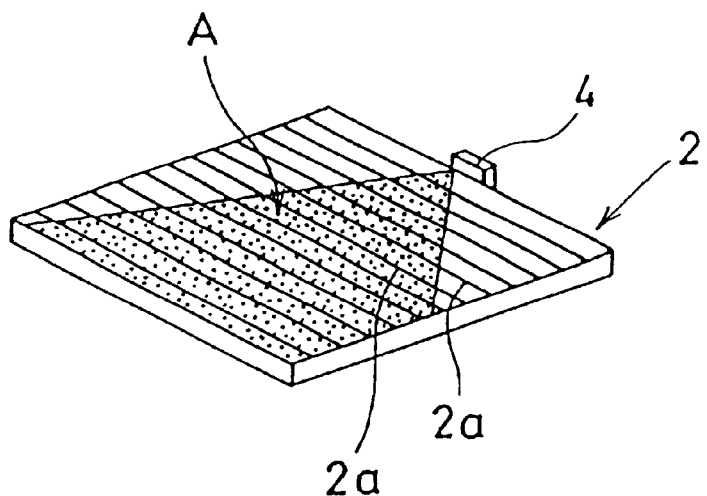
FIG. 9 is a perspective view of the conventional type spread illuminating apparatus in which the light emitting diode illuminates the transparent substrate directly.
Figure 10:
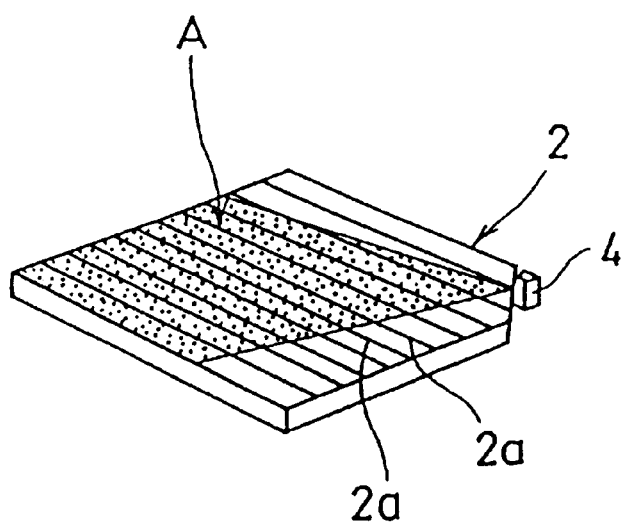
FIG. 10 is a perspective view of a variation example of the conventional type spread illuminating apparatus shown in FIG. 1.

The prism sheet 5 is composed of a transparent material having a given refractive index, comprises a row of prisms continuously forming triangular grooves in a cross direction of the transparent substrate 2 with the triangular grooves running in parallel with a thickness direction of the transparent substrate, and functions as a controlling means to control the directivity of the light entering the transparent substrate 2. That is, the light L emitted from the light emitting diode 4 is refracted when passing through the prism sheet 5 and is modified in its directivity, expanding its illuminating range. As a result, the emitting distribution pattern A is adapted to cover approximately all over the transparent substrate 2, whereby the liquid crystal element 1 (FIG. 7) can be uniformly illuminated. Further, brightness may be increased as a whole by providing a plural number of light emitting diodes 4 and disposing a prism sheet 5 at a place corresponding to each diode 4 (or a single longer prism sheet 5).

Figure 2:
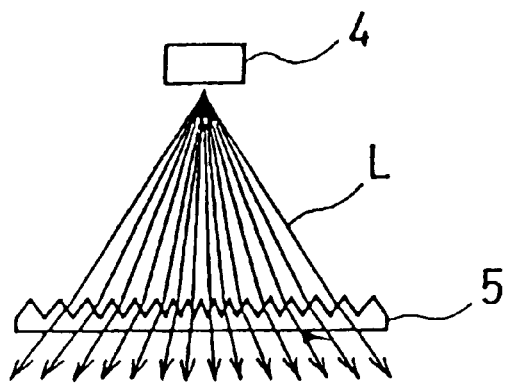
FIG. 2 is an application example of the prism sheet shown in FIG. 1.

Now, the light diffusion characteristic of the prism sheet 5 can be controlled by altering the inclination angle or the pitch of the mountain and valley portion forming the prism row. And, the emitting distribution pattern A can be controlled without any restriction by determining the diffusion characteristic based on the light emitting distribution characterized by the emitting diode 4. FIG. 2 shows an example where the inclination angle of the prism sheet 5 becomes smaller and the pitch becomes larger with an increase in the distance from the light emitting diode 4, whereby the illuminating range is effectively expanded.

Figure 3:
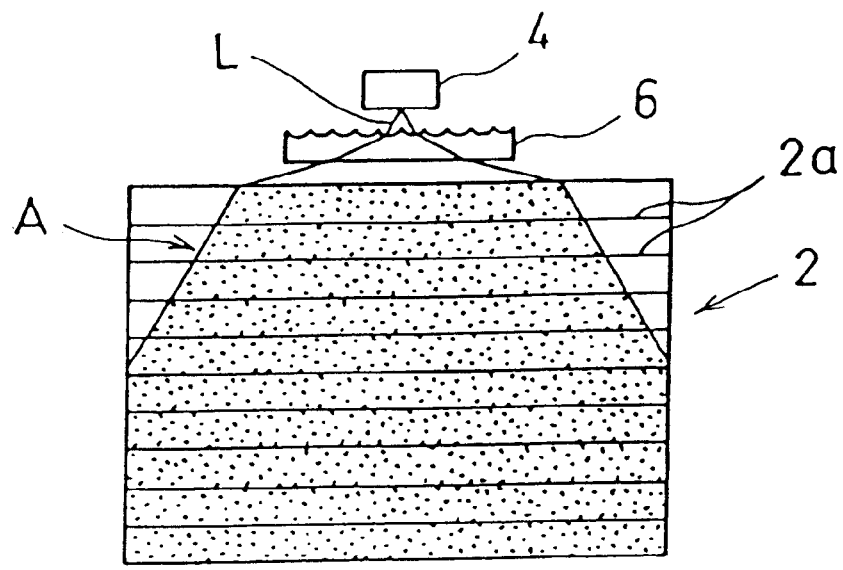
FIG. 3 is a schematic diagram of the main portion of the second embodiment of the spread illuminating apparatus of the present invention.

FIG. 3 schematically shows the main portion of the spread illuminating apparatus of the second embodiment of the present invention. In this case, a concave lens-like sheet 6 is disposed between the transparent substrate 2 and the light emitting diode 4. This concave lens-like sheet 6 is composed of a transparent material having a given refractive index, comprises a row of concave lenses where a plural number of concave lens-like portions are continuously provided in a cross direction of the transparent substrate 2, and functions as the controlling means to control the directivity of the light entering the transparent substrate 2 just like the prism sheet 5 in the first embodiment.

Further, the light diffusion characteristic of the concave lens-like sheet 6 can be controlled by the radius of curvature, the pitch, etc. of the concave portions forming the row of concave lenses. And, the emitting distribution pattern A can be controlled without any restriction by determining the diffusion characteristic based on the light emitting distribution characterized by the light emitting diode 4. Moreover, brightness may be increased as a whole by providing a plural number of light emitting diode 4 and disposing a concave lens-like sheet 6 at a place corresponding to each diode 4 (or a single longer concave lens-like sheet 6). Explanations of operations and effects similar to those of the first embodiment are omitted.

Figure 4:
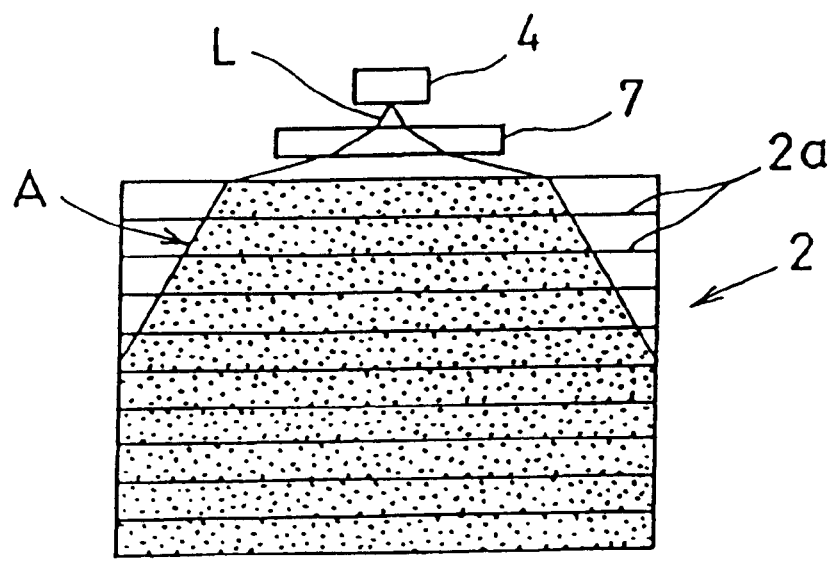
FIG. 4 is a schematic diagram of the main portion of the third embodiment of the spread illuminating apparatus of the present invention.

FIG. 4 schematically shows the main portion of the spread illuminating apparatus of the third embodiment of the present invention. In this case, a light diffusion film 7 is disposed between the transparent substrate 2 and the light emitting diode 4. The light diffusion film 7 is constituted by, for instance, a light diffusion layer containing light diffusion material formed on a transparent substrate or a transparent substrate itself containing light diffusion material, and functions as a controlling means for controlling the directivity of the light entering the transparent substrate 2 just like the prism sheet 5 and the concave lens-like sheet 6 in the first and second embodiment respectively.

Further, the light diffusion characteristic of the light diffusion film 7 can be controlled by altering the content density of the light diffusion material portion by portion, and the emitting distribution pattern A can be controlled without any restriction by determining the diffusion characteristic based on the emitting distribution characterized by the light emitting diode 4. Moreover, brightness can be increased as a whole by providing a plural number of light emitting diode 4 and disposing a light diffusion film 7 at a place corresponding to each diode 4 (or a single longer light diffusion film 7). Explanations of operations and effects similar to those of the first embodiment are omitted.

For reference, in the first to third embodiments of the present invention, discrete controlling means (5, 6 and 7) are employed in order to control the directivity of the light entering the transparent substrate 2. But, desired operations and effects can be obtained by forming a diffusion layer having same configurational characteristics or functions as the above controlling means directly on the side surface of the transparent substrate 2 facing the light emitting diode 4.

Figure 5:
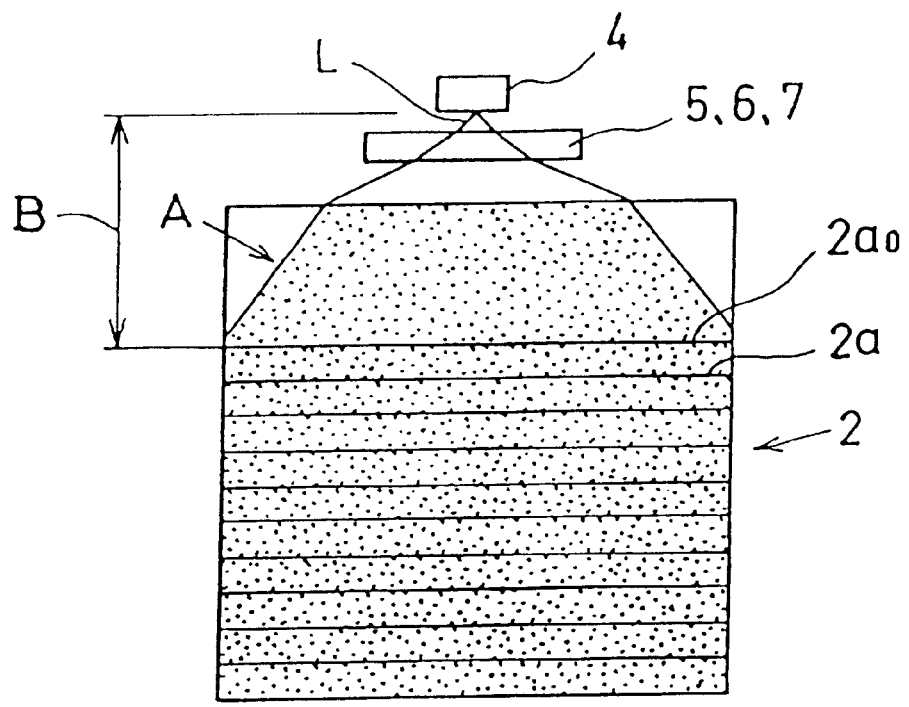
FIG. 5 is a schematic diagram of the main portion of the forth embodiment of the spread illuminating apparatus of the present invention.

FIG. 5 schematically shows the main portion of the spread illuminating apparatus of the fourth embodiment of the present invention. In this embodiment, the distance from the surface of the transparent substrate 2 facing the light emitting diode 4 to the nearest groove $2a_0$ (light emitting element) is extended compared with the other embodiments (FIG. 1, FIG. 3 and FIG. 4). Accordingly, a given distance B is provided between the groove $2a$ (light emitting elements formed on the transparent substrate 2 and the light emitting diode 4.

And, considering the fact that the emitting distribution pattern A characterized by the light emitting diode 4 spreads wider with an increase in the distance from the light emitting diode 4 thereby modifying the light directivity, the groove $2a$ of the transparent substrate 2 is provided at the distance B where the emitting distribution pattern A cannot be recognized, and the area where the groove $2a$ is provided is overlapped on the liquid crystal element 1 (FIG. 7), whereby the uniform illumination of the spread illuminating apparatus can be achieved. That is, in this embodiment, the controlling means to control the directivity of the light entering the transparent substrate 2 is provided by giving the fixed distance B between the light emitting element $2a_0$ provided on the transparent substrate 2 and the light emitting diode 4. Accordingly, the given distance B is preferably determined in consideration of the modified directivity of the light L emitted from the light emitting diode 4 (the light diffusion characteristic of the controlling means needs to be also considered in the case of the controlling means 5, 6 and 7).

Figure 6:
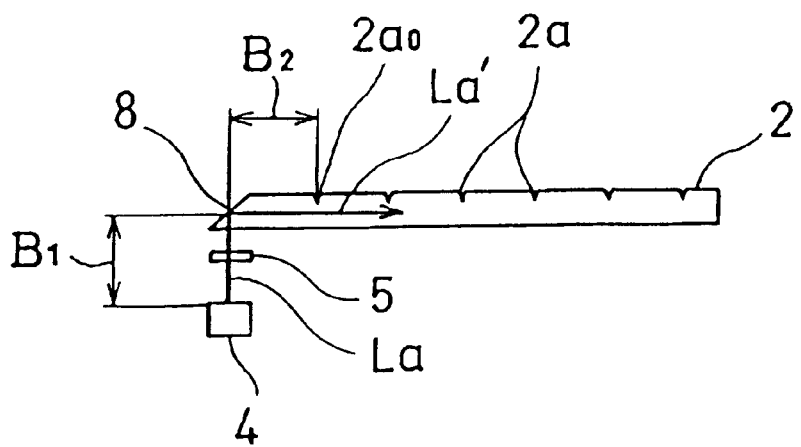
FIG. 6 is a side view of an application example of the spread illuminating apparatus shown in FIG. 5.

FIG. 6 shows an application example of the fourth embodiment of the present invention. In this example, the light emitting diode 4 is disposed in such a manner as the axis La of the emitted light of the light emitting diode 4 is set at a given angle to the spreading surface of the transparent substrate 2 (a horizontal plane in FIG. 6), and further a reflection means 8 is provided for turning the axis La of the emitted light in a direction La' parallel with the spreading surface of the transparent substrate 2. For reference, the sum of the distance $B_1$ from the light emitting diode 4 to the reflection means 8 and the distance $B_2$ from the reflection means 8 to the light emitting element $2a_0$ is equal to the given distance B. In this constitution the distance between the light emitting diode 4 and the transparent substrate 2 can be secured in the three dimensional positional relation. This effectively works in case the given distance B cannot be secured on the spreading surface of the transparent substrate 2, which extends the application of the spread illuminating apparatus of this embodiment.

For reference, in the shown example, the reflection means 8 is formed by chamfering the end of the transparent substrate 2 and evaporating metal (silver, aluminum, etc.) to the chamfered portion, but it is also possible to apply a reflection plate separated from the transparent substrate 2. In the example figured, the axis La of the emitted light of the light emitting diode 4 and the direction La' parallel with the spreading surface of the transparent substrate 2 are set to make a right angle to each other, but they can be set at any appropriate angles according to the arrangement of members without limitation to the right angle.

Further, although figures are omitted, a combination of two or more of the controlling means (prism sheet 5, concave lens-like sheet 6, light diffusion film 7, a given distance B, reflection means 8, etc.) explained in the first to fourth embodiments is possible. According to such a combination, the directivity of the light emitted from the light emitting diode 4 can be controlled in a multiple manner before the light enters the transparent substrate 2, whereby the emitting distribution pattern A characterized by the light emitting diode 4 can be more effectively modified.

As the present invention is constituted as mentioned above, the following effects are expected. First, according to the first aspect of the present invention, in the miniaturized and light weighted spread illuminating apparatus, a uniform illumination can be achieved while intending to improve a brightness by projecting the light of the spot-like light source directly into the transparent substrate.

Further, according to the aspects 2, 3, 4, 5 and 7 of the present invention, the emitting distribution pattern characterized by the spot-like light source can be modified by controlling the directivity of the light emitted from the spot-like light source before the light enters the transparent substrate, whereby the uniform illumination can be achieved.

Further, according to the aspects of 6, 8 and 10 of the present invention, the emitting distribution pattern characterized by the spot-like light source can be modified more effectively. In addition, according to the aspect 9 of the present invention, the application of the spread illuminating apparatus of the present invention can be expanded.

What is claimed is:

1. A spread illuminating apparatus in which a spot-like light source is disposed facing a transparent substrate made of a transparent material and close to a side surface thereof, wherein a control means having grooves parallel with the thickness direction of the transparent substrate for controlling the directivity of light entering said transparent substrate is provided between said transparent substrate and said spot-like light source.

2. A spread illuminating apparatus according to claim 1, wherein said control means is of a prism sheet.

3. A spread illuminating apparatus according to claim 2 wherein a light diffusion characteristic of said control means is varied at each position based on an emitting distribution characteristic of said spot-like source, whereby said light diffusion characteristic is optimized.

4. A spread illuminating apparatus, wherein said control means for controlling the directivity of the light is formed by combining two or more of the control means according to claim 2.

5. A spread illuminating apparatus according to claim 1, wherein said control means is of a concave lens-like sheet.

6. A spread illuminating apparatus according to claim 3 wherein a light diffusion characteristic of said control means is varied at each position based on an emitting distribution characteristic of said spot-like source, whereby said light diffusion characteristic is optimized.

7. A spread illuminating apparatus, wherein said control means for controlling the directivity of the light is formed by combining two or more of the control means according to claim 3.

8. A spread illuminating apparatus according to claim 1, wherein said control means is formed on the side surface of said transparent substrate.

9. A spread illuminating apparatus according to claim 8 wherein a light diffusion characteristic of said control means is varied at each position based on an emitting distribution characteristic of said spot-like source, whereby said light diffusion characteristic is optimized.

10. A spread illuminating apparatus, wherein said control means for controlling the directivity of the light is formed by combining two or more of the control means according to claim 8.

11. A spread illuminating apparatus according claim 1, wherein a light diffusion characteristic of said control means is varied at each position based on an emitting distribution characteristic of said spot-like light source, whereby said light diffusion characteristic is optimized.

12. A spread illuminating apparatus, wherein said control means for controlling the directivity of the light is formed by combining two or more of the control means according to claim 11.

13. A spread illuminating apparatus according to claim 1, wherein said control means is formed with a given distance between a light emitting element provided on said transparent substrate and said spot-like light source.

14. A spread illuminating apparatus according to claim 13, wherein said given distance is set in consideration of the modified directivity of light emitted from said spot-like light source.

15. A spread illuminating apparatus, wherein said control means for controlling the directivity of the light is formed by combining two or more of the control means according to claim 14.

16. A spread illuminating apparatus according to claim 14, wherein said spot-like light source is disposed in such a manner that an axis of the light emitted from said spot-like light source makes a given angle against a spreading surface of said transparent substrate, and a reflection means is provided to turn the axis of the emitting light in a direction parallel with the spreading surface of said transparent substrate.

17. A spread illuminating apparatus according to claim 13, wherein said spot-like light source is disposed in such a manner that an axis of the light emitted from said spot-like light source makes a given angle against a spreading surface of said transparent substrate, and a reflection means is provided to turn the axis of the emitting light in a direction parallel with the spreading surface of said transparent substrate.

18. A spread illuminating apparatus, wherein said control means for controlling the directivity of the light is formed by combining two or more of the control means according to claim 17.

19. A spread illuminating apparatus, wherein said control means for controlling the directivity of the light is formed by combining two or more of the control means according to claim 13.

20. A spread illuminating apparatus according to claim 1, wherein said control means for controlling the directivity of the light is formed by combining two or more of the control means.

21. A spread illuminating apparatus according to claim 1 wherein a light diffusion characteristic of said control means is varied at each position based on an emitting distribution characteristic of said spot-like source, whereby said light diffusion characteristic is optimized.

* * * * *